(Model.)
C. MÜLLER.
TOOL HOLDER FOR LATHES.
No. 272,304. Patented Feb. 13, 1883.
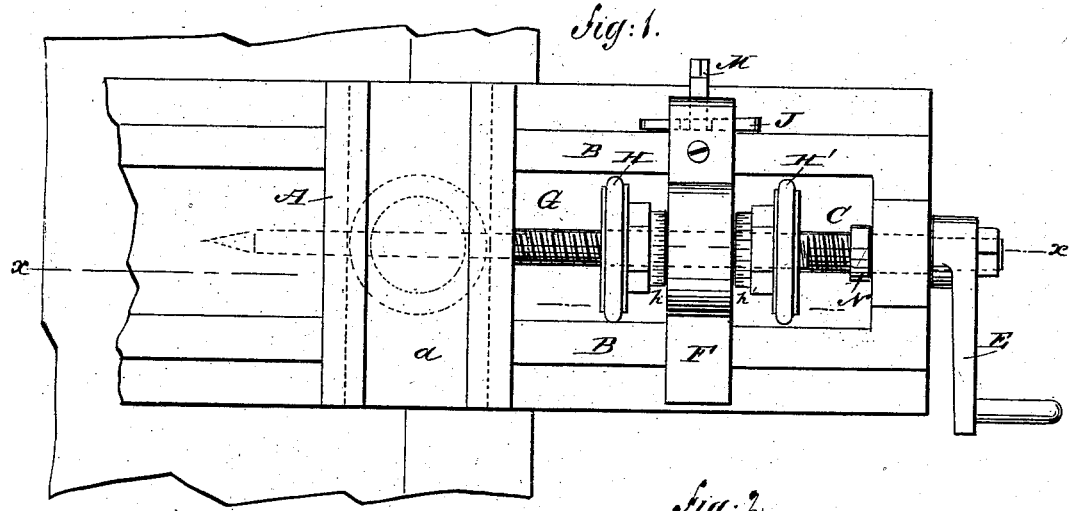
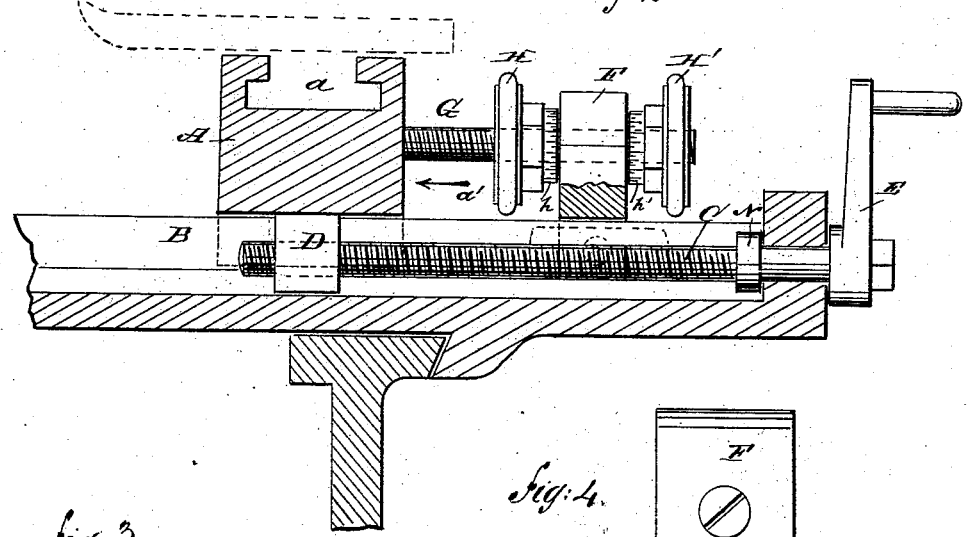
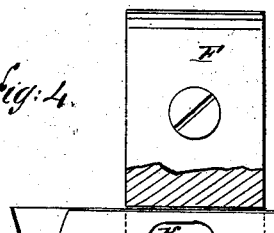
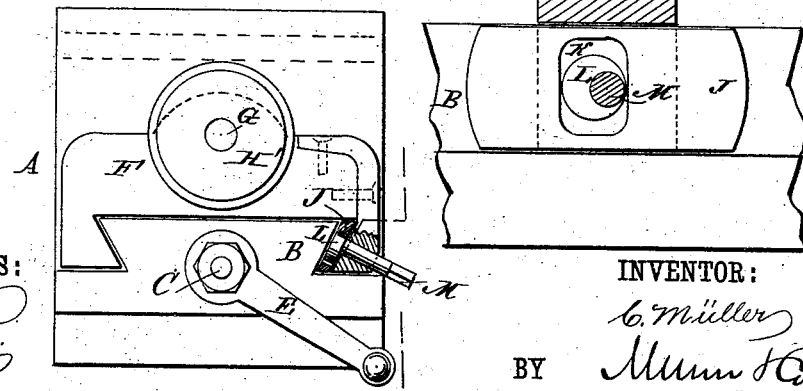
WITNESSES:
INVENTOR:
C. Müller
BY
ATTORNEYS.

UNITED STATES PATENT OFFICE.

CONRAD MÜLLER, OF COLUMBUS, OHIO.

TOOL-HOLDER FOR LATHES.

SPECIFICATION forming part of Letters Patent No. 272,304, dated February 13, 1883.

Application filed July 15, 1882. (Model.)

*To all whom it may concern:*

Be it known that I, CONRAD MÜLLER, of Columbus, in the county of Franklin and State of Ohio, have invented a new and Improved Tool-Holder for Lathes, of which the following is a full, clear, and exact description.

The object of my invention is to provide a new and improved device for holding and adjusting the cutting-tool of a lathe in such a manner that it will be held firmly and can be adjusted very nicely and accurately without being affected by the inaccuracies and lost motion of the screw-spindle for moving the tool-holding block.

The invention consists in a screw and nuts mounted thereon for adjusting the tool-holding block or slide of a lathe within the limits of the lost motion of the main spindle, which nuts have graduated collars to facilitate their accurate adjustment.

The invention further consists in a cross-piece in which this adjusting-screw is journaled, which cross-piece is provided with devices for locking it in position.

The invention also consists in a wedge provided with a squared aperture, combined with an eccentric disk for moving the wedge to lock or unlock the cross-piece.

Reference is to be had to the accompanying drawings, forming part of this specification, in which similar letters of reference indicate corresponding parts in all the figures.

Figure 1 is a plan view of a tool-holder for a lathe provided with my improvement. Fig. 2 is a longitudinal sectional elevation of the same on the line $x\,x$, Fig. 1. Fig. 3 is an end elevation of the same, parts being shown in section. Fig. 4 is an inside elevation of the wedge for locking the tool-holding block or slide in place.

A sliding block, A, provided in its bottom with a transverse dovetailed recess, rests on the dovetailed tracks B of the frame, which tracks pass into the dovetailed groove in the bottom of the block or slide A. A screw-spindle, C, passing into a nut, D, in the bottom of the block or slide A, is journaled in the end of the frame, and is provided with a crank-handle, E, or a hand-wheel for turning it, and thereby moving the slide or block A forward or backward. The block A is provided in its top with a longitudinal groove, $a$, for receiving the bottom of the tool-holder. (Shown in dotted lines in Fig. 1.) A cross-piece, F, provided in its bottom with a dovetailed recess, rests on the tracks B. A screw-spindle, G, which is held to turn in the block A, but cannot move longitudinally in the same, passes through the cross-piece F, and on it nuts H and H' are mounted on opposite sides, which nuts have graduated collars $h\,h'$. A wedge, J, is placed between one of the shanks of the cross-piece F and the outer surface of one of the tracks B, and this wedge is provided with a square or oblong aperture, K, in which a disk, L, is located, which is eccentrically mounted on the inner end of pintle M, passing through this shank of the cross-piece F, and having its outer end squared, so that a key will fit thereon. The spindle C is provided with a rigidly-mounted collar, N, to prevent a movement of this spindle in the direction of its length.

The operation is as follows: The block or slide A is moved on the tracks B by turning the spindle C; but as this spindle has some lost motion the cutting-tool cannot be adjusted very nicely and accurately, especially in cutting screw-threads. To accomplish this I have provided the screw G and the nuts H H'. When the tool has been adjusted by means of the spindle C, the cross-piece F is locked in place on the tracks by turning the pintle M in such a manner that the eccentric disk L will push the wedge J in between the shank of the cross-piece and the outer surface of the track. If the block A is then to be moved slightly in the direction of the arrow $a'$, the nut H' is so adjusted that its inner end will be from the corresponding side of the cross-piece F the distance the block A is to be moved. Then the nut H is turned, whereby the block A will be moved in the direction of the arrow $a'$ until the inner end of the nut H' rests against the cross-piece F. In a similar manner the block A can be moved in the inverse direction of the arrow $a'$. Before the block A can be moved by the screw-spindle C the cross-piece F must be loosened, which is accomplished by turning the pintle M in such a manner that the eccentric disk L loosens the wedge J. It is evident that the adjustment of the block A by means of the screw G and the nuts H H' can only be very minute, as it must remain within the limits of the lost motion of the spindle C. To facilitate these minute adjustments I have provided the nuts H H' with the graduations.

This device can also be used in planing and smoothing machines, or other machines for a like purpose.

Having thus fully described my invention, I claim as new and desire to secure by Letters Patent—

1. In a device for adjusting the position of the tool on a lathe, the combination, with a tool-holder block or slide and means for adjusting the same, of a screw-spindle swiveled to the said block or slide, and provided with nuts for taking up the motion lost in the first adjustment, substantially as herein shown and described.

2. In a lathe, the combination, with the slide or block A and the screw-spindle C, of the cross-piece F, the screw G, and the nuts H H' thereon, substantially as herein shown and described, and for the purpose set forth.

3. In a lathe, the combination, with the slide or block A and the screw-spindle C, of the cross-piece F, the screw G, and the nuts H H', mounted thereon, and provided with graduations on their collars, substantially as herein shown and described, and for the purpose set forth.

4. In a lathe, the combination, with the slide or block A and the screw-spindle C, of the cross-piece F, the screw G, the nuts H H', and a device for locking the cross-piece F in position on the tracks, substantially as herein shown and described, and for the purpose set forth.

5. In a lathe, the combination, with the slide or block A and the screw-spindle C, of the cross-piece F, the screw G, the nuts H H', and the wedge J between one shank of the frame F and one of the tracks of the frame, substantially as herein shown and described, and for the purpose set forth.

6. In a lathe, the combination, with the slide or block A and the screw-spindle C, of the cross-piece F, the screw G, the nuts H H', the wedge J, and devices for adjusting this wedge, substantially as herein shown and described, and for the purpose set forth.

7. In a lathe, the combination, with the slide or block A and the screw-spindle C, of the cross-piece F, the screw G, the nuts H H', the wedge J, provided with a squared aperture, K, the eccentric disk L in this aperture, and the pintle M, on which this disk is mounted, substantially as herein shown and described, and for the purpose set forth.

CONRAD MÜLLER.

Witnesses:
THEOPHILES DILL,
FERDINAND BUELLOR.